(12) United States Patent
Kim et al.

(10) Patent No.: US 9,727,210 B2
(45) Date of Patent: Aug. 8, 2017

(54) USER TERMINAL DEVICE FOR SUPPORTING DATA SHARE FUNCTION AND METHODS THEREOF

(71) Applicant: SAMSUNG ELECTRONICS CO., LTD., Suwon-si, Gyeonggi-do (KR)

(72) Inventors: Jeong-hun Kim, Hwaseong-si (KR); Hyung-jong Kang, Seoul (KR); Hwan-jun Kim, Suwon-si (KR); In-chang Park, Suwon-si (KR); Gi-won Seo, Suwon-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 122 days.

(21) Appl. No.: 14/682,235

(22) Filed: Apr. 9, 2015

(65) Prior Publication Data

US 2015/0331728 A1  Nov. 19, 2015

(30) Foreign Application Priority Data

May 14, 2014 (KR) ........................ 10-2014-0057866

(51) Int. Cl.
| | | |
|---|---|---|
| *G06F 3/00* | (2006.01) | |
| *G06F 9/44* | (2006.01) | |
| *G06F 9/46* | (2006.01) | |
| *G06F 13/00* | (2006.01) | |
| *G06F 3/0482* | (2013.01) | |
| *G06F 9/54* | (2006.01) | |
| *H04L 29/08* | (2006.01) | |
| *H04L 29/06* | (2006.01) | |

(52) U.S. Cl.
CPC ............ *G06F 3/0482* (2013.01); *G06F 9/546* (2013.01); *H04L 67/1095* (2013.01); *H04L 67/38* (2013.01)

(58) Field of Classification Search
None
See application file for complete search history.

(56) References Cited

U.S. PATENT DOCUMENTS

| | | | |
|---|---|---|---|
| 2011/0219332 A1* | 9/2011 | Park ................. | H04M 1/72583 715/808 |
| 2012/0243048 A1* | 9/2012 | Asai ...................... | G06F 3/1205 358/1.16 |
| 2013/0124872 A1* | 5/2013 | Shen ...................... | G06F 9/545 713/189 |

* cited by examiner

*Primary Examiner* — Craig Dorais
(74) *Attorney, Agent, or Firm* — Staas & Halsey LLP

(57) ABSTRACT

A user terminal device is provided. The user terminal device includes a storage configured to store a plurality of applications, a memory configured to copy the plurality of applications stored in the storage, a controller configured to, in response to a source application and a target application being selected from a plurality of applications copied into the memory and a data share function being selected, convert data of the source application into a serialized stream and provide the serialized stream to the target application. Therefore, data is efficiently shared between applications.

18 Claims, 12 Drawing Sheets

FIG. 3

| Content your app shares | Recommended DataPackage format | Additional formats your DataPackage should include |
|---|---|---|
| Unformatted plain text | Text | None |
| Link | Uri | Text<br>HTML, if you're creating a link back to your app.<br>HTML , if an abstract of the linked content is available.<br>Include a link back to the source in the HTML data. |
| Formatted content/HTML | HTML | Text, if the content contains only text.<br>Bitmap, if the content contains only an image. |
| File | StorageItems | None |
| Single Image | Bitmap | StorageItems, if the image is also accessible as a file. |
| Multiple files and images | StorageItems | None |
| Custom formats | Custom formats | |

FIG. 4

| Data Type | Data Name | Description |
|---|---|---|
| uint | StreamWidth | WIDTH OF IMAGE STREAM TO BE TRANSMITTED |
| uint | StreamHeight | HEIGHT OF IMAGE STREAM TO BE TRANSMITTED |
| uint | StreamResolution | DPI OF IMAGE STREAM |
| uint | StreamFormat | IMAGE FORMAT |
| IRandomAccessStream | ImageStream | Image Stream |
| bool | SkipBlankPage | User preference option. |
| enum | PrintingQuality | User preference option. |

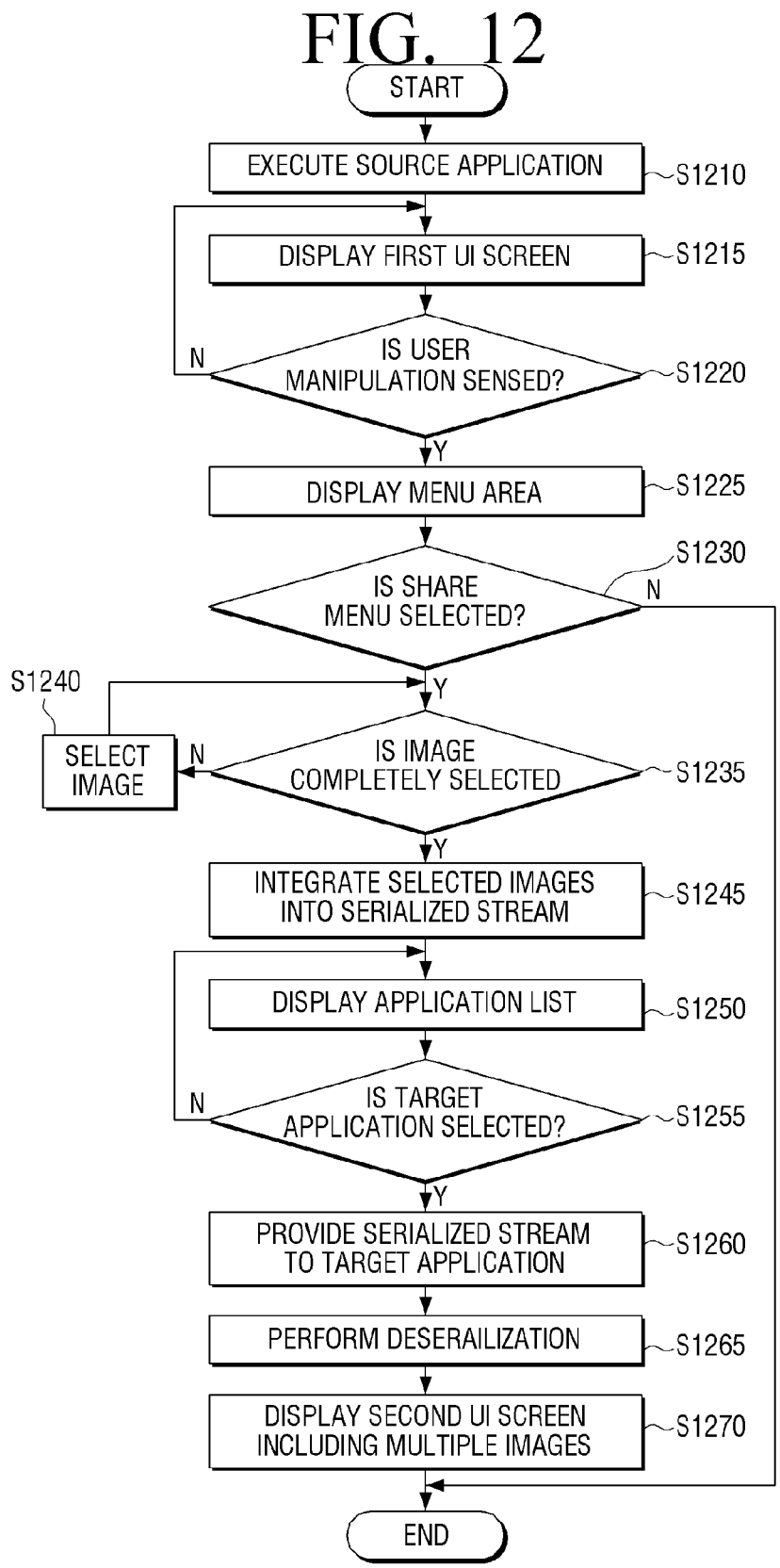

USER TERMINAL DEVICE FOR SUPPORTING DATA SHARE FUNCTION AND METHODS THEREOF

CROSS-REFERENCE TO RELATED APPLICATIONS

This application claims priority under 35 U.S.C. §119 from Korean Patent Application No. 10-2014-0057866, filed on May 14, 2014, in the Korean Intellectual Property Office, the disclosure of which is incorporated herein by reference in its entirety.

BACKGROUND

1. Field

The present inventive concept generally relates to providing a user terminal device for supporting a data share function of sharing data between applications and methods thereof.

2. Description of the Related Art

The recent development of electronic technologies has brought the development and distribution of various types of user terminal devices. In particular, user terminal devices that use various types of applications, such as a portable phone, a tablet PC, etc., have increasingly been used.

User terminal devices provide services to users by using various types of hardware and software. An operation of such a user terminal device is driven by an operating system (OS) that is installed in the user terminal device.

The OS is system software that provides a hardware abstracting platform and a common system service to manage system hardware and execute application software. Windows that have been made by Microsoft is a representative OS. Windows 8, the latest version of the OS, has been recently developed.

Differently in a desktop environment, in a Windows 8 store app environment, i.e., a metro environment, a direct data transmission between different applications is impossible. Therefore, Windows 8 supports a share function to share data between applications. Here, an application that provides data is referred to as a source application, and an application that is provided with data is referred to as a target application. A share broker mediates between applications.

However, an existing source application stores each of several images in a file format and transmits a stored file to a target application in order to provide the several images to the target application. Therefore, the source application necessarily performs a process of storing data in a storage, and the target application necessarily performs a process of loading data. Since a file Input/Output (I/O) operation is performed two times as described above, a data share between applications takes a large amount of time. In particular, if several images are to be shared, the above-mentioned problem grows more serious.

Therefore, there is a need for methods of efficiently sharing data between a plurality of different applications.

SUMMARY

Exemplary embodiments address at least the above problems and/or disadvantages and other disadvantages not described above. The exemplary embodiments, however, are not required to overcome the disadvantages described above and thus need not overcome any of the problems described above.

The exemplary embodiments provide a user terminal device for rapidly and efficiently sharing data between a plurality of different applications and methods thereof.

According to an aspect of the exemplary embodiments, there is provided a user terminal device including: a storage configured to store a plurality of applications; a memory configured to copy the plurality of applications stored in the storage; a controller configured to, in response to a data share function sharing data being used by a source application of the plurality of applications among the data stored in the memory being selected, convert the data into a serialized stream and provide the serialized stream to a target application of the plurality of applications.

The plurality of applications may share the data according to a custom data format that is defined to provide the data share function.

The custom data format may include at least one selected from a first data format indicating a width of a stream to be transmitted, a second data format indicating a height of the stream, a third data format indicating a resolution, a fourth data format indicating an image format, a fifth data format indicating real image data, and a sixth data format indicating a preference option.

The user terminal device may further include a display unit. The controller may display a first user interface (UI) screen corresponding to a source application in response to the source application being selected from a plurality of applications, display a menu area including a share menu on a side of the first UI screen in response to a preset user manipulation being sensed, additionally display an application list in the menu area in response to the share menu being selected from the menu area, and integrate a plurality of images into one serialized stream and provide the one serialized stream to a target application in response to the target application being selected from the application list and the plurality of images being selected from the first UI screen.

The application list may be a list that collects information about an application capable of operating with the source application or an application capable of using the data.

In response to the serialized stream being provided to the target application, the controller may display a second UI screen corresponding to the target application on the display unit. The second UI screen may include the plurality of images.

The storage may store an operating system (OS) that has a first operation mode for driving a desktop application and a second operation mode for driving a metro application. The controller may execute the data share function according to the OS.

In the user terminal device, the controller converts the data into the serialized stream using a binary serialization, an Extensible Mark-up Language (XML) serialization, or a Simple Object Access Protocol (SOAP) serialization.

According to another aspect of the exemplary embodiments, there is provided a method of sharing data of a user terminal device, the method including: in response to a data share function sharing data being used by a source application of a plurality of applications installed in the user terminal device being selected, converting the data into a serialized stream; and providing the serialized stream to a target application of the plurality of applications.

The plurality of applications may share the data according to a custom data format that is defined to provide the data share function.

The custom data format may include at least one selected from a first data format indicating a width of a stream to be transmitted, a second data format indicating a height of the stream, a third data format indicating a resolution, a fourth data format indicating an image format, a fifth data format indicating real image data, and a sixth data format indicating a preference option.

The method may further include: in response to the source application being executed, displaying a first UI screen corresponding to the source application; and in response to a preset user manipulation being sensed, additionally displaying a menu area on a side of the first UI screen. The data share function may be executed in response to a share menu being selected from the menu area.

The converting the data into the serialized stream may include: in response to a plurality of images being selected from the first UI screen, integrating an image stream of each of the plurality of images to generate the serialized stream.

The method may further include: in response to the serialized stream being provided to the target application, displaying a second UI screen corresponding to the target application. The second UI screen may include the plurality of images.

The user terminal device may be driven according to an OS that has a first operation mode for driving a desktop application and a second operation mode for driving a metro application.

According to another aspect of the exemplary embodiments, there is provided a recording medium storing a program for executing a method of sharing data. The method may include: in response to a data share function being selected, converting data, which is being used by a source application of a plurality of applications, into a serialized stream; providing the serialized stream to a target application of the plurality of applications; and performing deserialization with respect to the serialized stream through the target application to detect the data. The data may include a plurality of images.

The plurality of applications may share the data according to a custom data format that is defined to provide the data share function.

According to an aspect of the exemplary embodiments, an apparatus for sharing data between a source application and a target application is described. The apparatus may include a storage to store the source application and the target application, and a hardware-based controller configured to control the source application to convert data used by the source application into a serialized stream and to provide the serialized stream to the target application where the controller is further configured to control the target application to deserialize the serialized stream to obtain the data for use by the target application.

In the apparatus, a source application transmits the serialized stream in a custom data format to a share broker and the share broker transmits the serialized stream in the custom data format to the target application.

BRIEF DESCRIPTION OF THE DRAWINGS

The above and/or other aspects will be more apparent by describing certain exemplary embodiments with reference to the accompanying drawings, in which:

FIG. 3 is a view illustrating a data package format according to an exemplary embodiment of the present general inventive concept;

FIG. 4 is a view illustrating a custom data format according to an exemplary embodiment of the present general inventive concept;

FIGS. 11 and 12 are flowcharts illustrating a method of sharing data according to various exemplary embodiments of the present general inventive concept.

DETAILED DESCRIPTION

Figure 1:
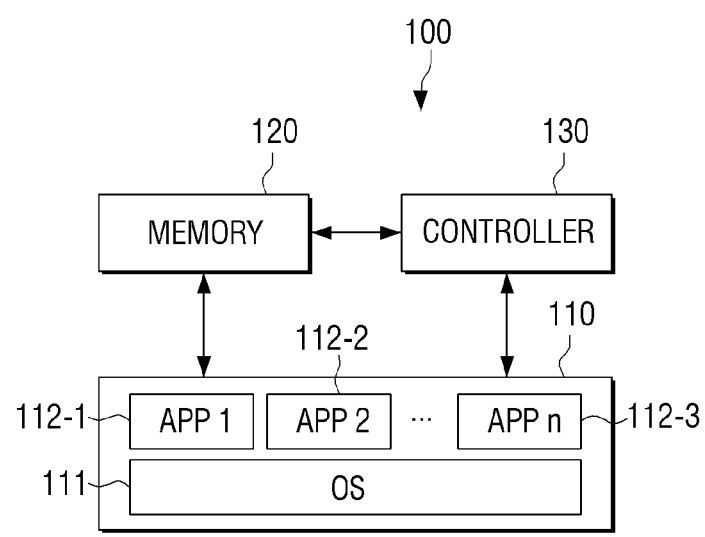
FIG. 1 is a block diagram illustrating a structure of a user terminal device according to an exemplary embodiment of the present general inventive concept.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1 is a block diagram illustrating a structure of a user terminal device 100 according to an exemplary embodiment of the present general inventive concept. The user terminal device 100 may be realized as any of various types of devices such as a portable phone, a tablet personal computer (PC), a portable multimedia player (PMP), a laptop PC, an MP3 player, an e-book player, a PC, etc.

Referring to FIG. 1, the user terminal device 100 includes a storage 110, a memory 120, and a controller 130.

The storage 110 is an element that storages various types of programs. An operating system (OS) 111, middleware, applications 112-1 through 112-$n$, etc. for driving the user terminal device 100 may be stored in the storage 110. The OS 111 stored in the storage 110 may be driven in one of a first operation mode that drives a desktop application and a second operation mode that drives a metro application. Here, the desktop application is an application that operates in a state such as an existing PC environment (i.e., appropriate for an input environment that is based on a keyboard and a mouse), and the metro application is an application that operates in a state such as a cellphone environment (i.e., appropriate for an input environment that is based on a touch screen). The OS 111 may be, for example, Windows 8 or Windows 8.1. Also, the metro application may be referred to as a Windows store app.

The storage 110 may be realized as various types of nonvolatile memories such as a hard disc, a flash memory, a universal serial bus (USB) memory, etc. Alternatively, the storage 110 may be realized as a storage medium connected to a user terminal device, a webserver connected through a wired or wireless network, or the like.

The memory 120 may include a memory such as a read only memory (ROM), a random access memory (RAM), or the like. Various types of programs stored in the storage 110 may be copied into the memory or may be copied into a nonvolatile memory of the memory 120.

The controller 130 may control an overall operation of the user terminal device 100 by using the programs copied into the memory 120. The controller 130 may include a central processing unit (CPU) or MICOM.

If power is supplied through an input of a turn-on command, the controller 130 copies the OS 111 stored in the storage unit 110 into the memory 120 and executes the OS 111 to boot a system. If the booting of the system is completed, the controller 130 may copy the various types of programs stored in the storage 110 into the memory 120 and execute the copied programs to perform various types of functions.

If the user terminal device 100 includes a display unit, the controller 130 may display icons or texts of the applications 112-1 through 112-n stored in the storage 110 on the display unit. If an arbitrary icon or text is selected, the controller 130 may execute a corresponding application to display a screen of the corresponding application on the display unit.

If a plurality of different applications are selected, the controller 130 copies the selected applications into the memory 120 and respectively executes the copied applications. The applications may perform various types of functions by using data stored in the memory 120. The controller 130 may perform a data share function so as to enable a first application of the applications to transmit data, which is being used or is usable, to a second application and share the data with the second application. The first application that provides the data may be referred to as a source application, and the second application that is provided with the data, such as by the source application, may be referred to as a target application. Also, for convenience of description, a screen that is generated by an execution of the first application may be referred to as a first UI screen and a screen that is generated by an execution of the second application may be referred to as a second UI screen.

A user may select the data share function by using various methods. For example, the user may execute the data share function by using a method of directly selecting a share menu from a menu area including the share menu corresponding to the data share function. Alternatively, if a voice command or a motion gesture matches with the data share function, the user may select the data share function by using the voice command or the motion gesture.

If the data share function is selected, the controller 130 converts data of the source application into a serialized stream and provides the serialized stream to the target application. The source application and the target application may be respectively programs in which a custom data format defined to provide the data share function are set up.

Since the controller 130 converts the data stored in the memory 120 into the serialized stream, as is, and provides the serialized stream to the target application, a process of re-uploading the data to the storage 110 to load the data may be omitted. Therefore, fast data sharing becomes possible.

Figure 2:
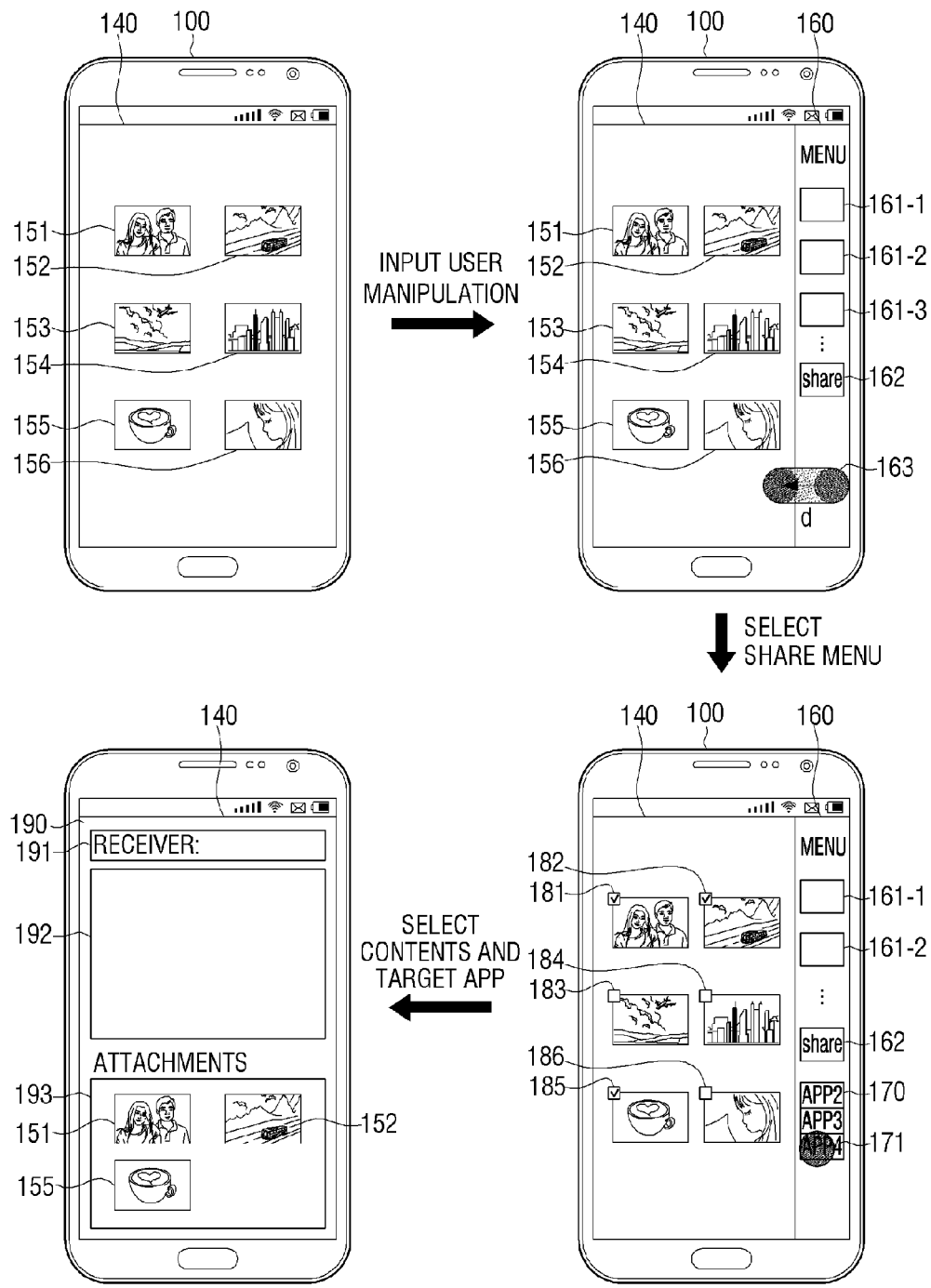
FIG. 2 is a view illustrating a process of sharing data according to an exemplary embodiment of the present general inventive concept.

FIG. 2 is a view illustrating a process of sharing data between a plurality of different applications. Referring to FIG. 2, the user terminal device 100 may further include a display unit 140. If the source application is executed, the controller 130 displays a first UI screen on the display unit 140. For example, in FIG. 2, an application, from which multimedia contents 151 through 156 such as various types of pictures or moving pictures may be read, is selected. The contents 151 through 156 are displayed in thumbnail forms on the first UI screen but are not limited thereto. Therefore, content names of the contents 151 through 156 may be arranged and displayed in a list form.

If a preset user manipulation is input in this state, the controller 130 displays a menu area 160 on a side of the first UI screen. For example, as shown in FIG. 2, if the user inputs a user manipulation 163 to touch an edge part of the display unit 140 and then drags the edge part in one direction (e.g., in direction d), a menu area 160 is opened according to a position of the touched point. However, a type of the user manipulation 163, and the position, shape, and size of the menu area 160 may be variously changed. For example, if the user uses other input techniques, such as a mouse pointer, a finger, a pen, etc., onto one of an upper, a lower, left, or a right edge part of the display unit 140, the controller 130 may display the menu area 160.

Menu area 160 may refer to a screen area for displaying various types of menus that may be selected by the user. The menu area 160 includes various types of menus 161-1, 161-2, 161-3, . . . , and 162. The various types of menus 161-1, 162-1, 161-3, . . . , and 162 may include any one or more of a search menu, a start menu, a setup menu, a share menu 162, etc.

The controller 130 may sense a menu selected by the user. As shown in FIG. 2, if the user terminal device 100 is realized as a cell phone, the controller 130 may detect coordinates of a touch point by using a touch sensor disposed under the display unit 140. The touch sensor may be implemented as various types of sensors such as a capacitive type, a decompressive type, a piezoelectric type, etc. Besides this, if the user terminal device 100 supports a pen input function, the controller 130 may sense a user manipulation that is performed by using an input means such as a pen. If the input means is a stylus pen including coil, the user terminal device 100 may include a magnetic field sensing sensor that may sense a magnetic field changed by the coil of the stylus pen. Therefore, the controller 130 may sense a touch gesture and a proximity gesture, such as hovering.

If the share menu 162 is selected from the menu area 160, the controller 130 executes a data share function. For example, the controller 130 may additionally display selection menus 181 through 186, from which the contents 151 through 156 may be selected, on the display unit 140. The user may touch the selection menus 181 through 186 to select a content that is a target to be shared. In FIG. 2, first, second, and fifth contents 151, 152, and 155 are selected, and APP4 171 is selected from an application list 170.

If a content is selected, the controller 130 may display the application list 170, from which a target application may be selected, in the menu area 160. In this case, the controller 130 may collect information about the other applications, other than a source application, among a plurality of applications to generate the application list 170. Alternatively, the controller 130 may selectively collect only information about an application that may operate with the source application or applications that may share the selected content, to generate the application list 170.

On the contrary, the controller 130 may provide the application list 170 for selecting the target application and, if the target application is selected, may selectively activate and display only a content that may be shared with the target application. Contents, such as picture images or moving pictures, have been described as being shared with reference to FIG. 2. However, besides such contents, various types of data, such as a text document, a program, a font file, etc., may be shared.

If a content to be shared and a target application are selected, the controller 130 displays a second UI screen 190 that is an execution screen of the selected target application. The source application integrates contents selected by the user into one serialized stream and provides the one serialized stream to the target application. The target application may display the provided contents on the second UI screen 190. FIG. 2 illustrates an example in which the target application is a mail program. In this case, the second UI screen 190 may include a an address box or receiver selection area 191, a content input area 192, an attachment area 193, etc. The contents 151, 152, and 155 provided from the source application may be displayed in the attachment area 193. The contents 151, 152, and 155 are displayed in thumbnail forms in FIG. 2 but are not limited thereto. For example, file names or other identifying data of shared contents may be displayed in the attachment area 193.

An operation of a user terminal device as described above may be executed by an OS. For example, if the OS is Windows 8, the OS may be set up to receive and transmit data in a predefined data package format.

FIG. 3 illustrates a data package format according to an exemplary embodiment of the present general inventive concept. Referring to FIG. 3, a content that an application shares may be defined as a plain text, link, formatted content/HTML, an image file, a single image, multiple files and images, custom formats, or the like.

FIG. 4 illustrates a custom format according to an exemplary embodiment of the present general inventive concept.

Referring to FIG. 4, various types of data formats may be defined to convert image files into a serialized stream and provide the serialized stream to another application. In detail, a custom data format may include at least one selected from a first data format indicating a width of a stream to be transmitted, a second data format indicating a height of the stream, a third data format indicating a resolution, a forth data format indicating an image format, a fifth format indicating real image data, and a sixth data format indicating a user preference option.

As shown in FIG. 4, data names of the first through fifth data formats are respectively defined as "StreamWidth", "Stream Height", "Stream Resolution", "Stream Format", and "ImageStream", and a printing option is defined as "SkipBlankPage", "PrintingQuality", etc. Here, "StreamWidth" and "StreamHeight" are data formats for determining a size of the stream. The formats shown in FIG. 4 are only an exemplary embodiment, and data types and data names may be differently set up.

A data package format name may use a name defined in a target application so as to enable the target application to accurately receive the data package format name. For example, the data package format name may be defined as "SharedImageStreams". In this case, a source application may convert data into a serialized stream and provide the serialized stream as name "SharedImageStreams" to the target application. If a serialized stream having a predefined name is input, the target application may process the serialized stream to share data.

As illustrated and described above with reference to FIG. 2, when a source application is first selected, a data share function is selected, and then a target application is selected, but their selection orders are not limited thereto. In other words, the selection orders may be variously changed according to exemplary embodiments.

For example, according to an exemplary embodiment, a UI may be provided to select the data share function and then sequentially select the source application and the target application.

According to another exemplary embodiment, the source application and the target application may be first selected, and then a menu area may be displayed. Also, if the user selects a share menu from the menu area, the data share function may be executed.

According to another exemplary embodiment, if the source application is selected, and then the target application that may operate with the source application is reselected, the data share function may be regarded as being selected and may be automatically executed.

Figure 5:
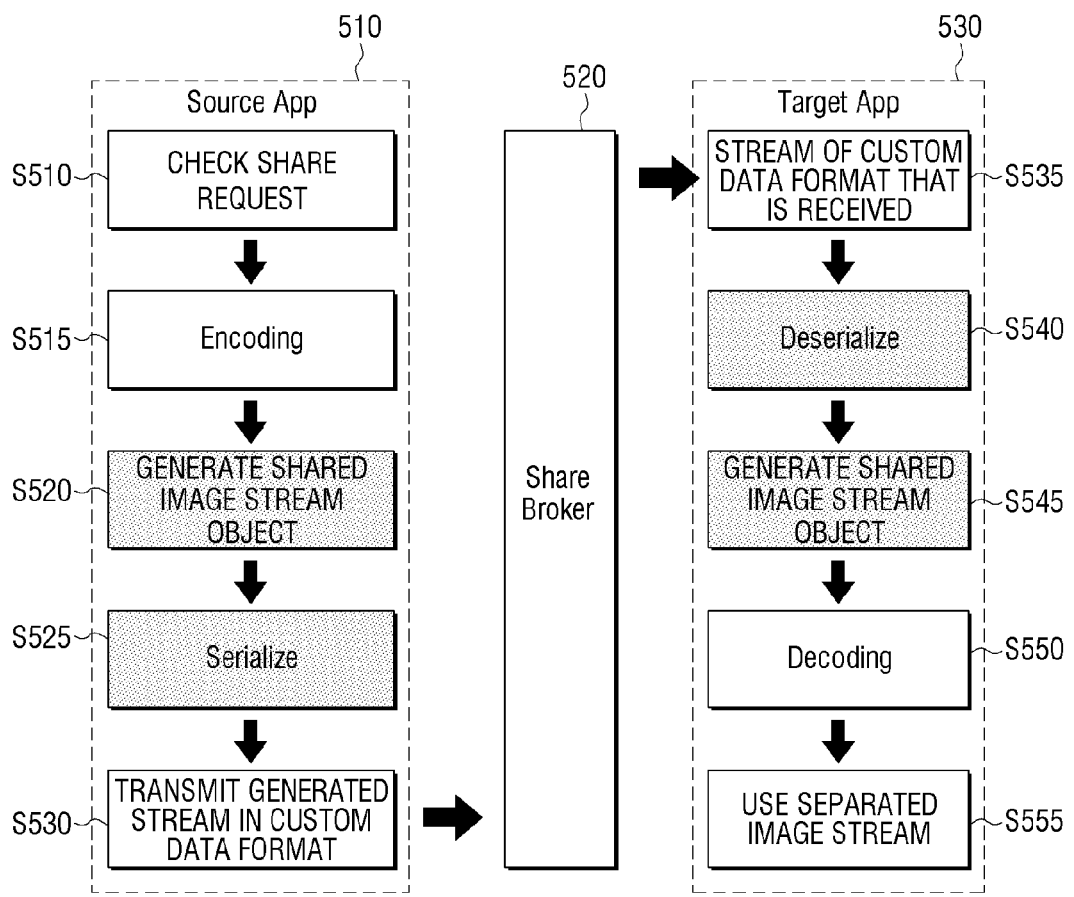
FIG. 5 is a view illustrating detailed operations of a source application and a target application.

FIG. 5 is a view illustrating detailed operations of a source application and a target application.

If data that a user wants to share is selected, and a share menu is selected as described above, the OS 111 requests a source share from a source application 510. For example, if a plurality of images are selected, and a share menu is selected, the source application 510 checks the request for the source share in operation S510. The source application 510 respectively encodes the images to be shared in operation S515 and converts the images into a plurality of objects "SharedImageStream" in operation S520. In operation S525, the source application 510 collects the converted objects as "SharedImageStream collection" and serializes the collected objects. Therefore, one serialized stream may be generated by combining or translating data associated with each of the collected objects. In operation S530, the source application 510 transmits the generated serialized stream in a predefined custom data format to a share broker program 520. For example, the source application 510 may transmit the generated serialized stream as data named "Shared ImageStream".

The share broker program 520 may generate a list of applications supporting a data share function, with reference to manifest data "appxmanifest". The share broker program 520 may be one of a plurality of software modules included in an OS.

The controller 130 displays the generated application list on the display unit 140. As described above with reference to FIG. 2, the user may select a target application 530 from the application list. The controller 130 may execute the target application 530 selected by the user.

If the executed target application 530 receives a request for processing share data from the OS, the executed target application 530 is provided with the serialized stream having a custom data format from the share broker program 520 in operation S535. The target application 530 deserializes the serialized stream in operation 540 and converts the deserialized stream into a plurality of separate objects "SharedImageStream". The target application 530 decodes the converted objects in operation S550, and extracts and uses necessary data in operation S555. For example, if a plurality of images are shared, the target application 530 may display single images extracted from streams of the respective images on a second UI screen.

Figure 6:
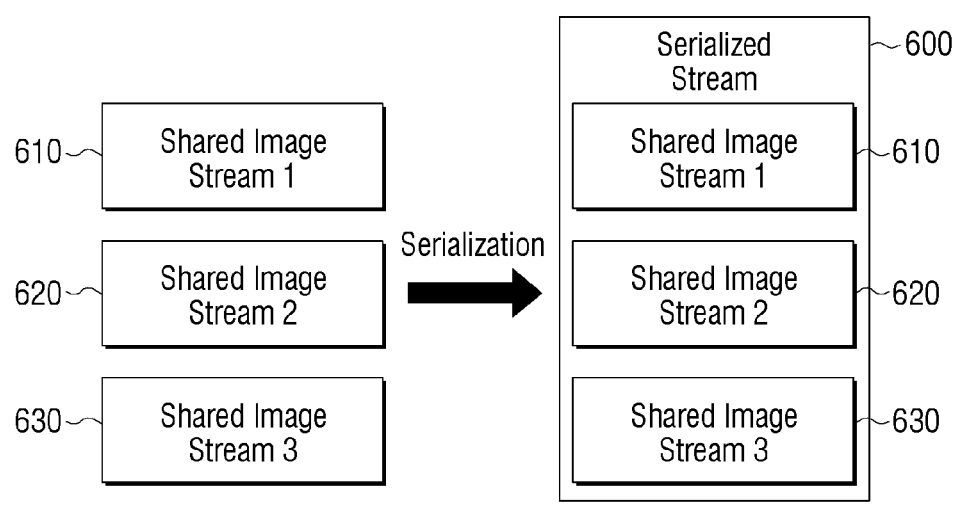
FIG. 6 is a view illustrating a serialization job performed in a source application.

FIG. 6 is a view illustrating a serialization job performed in a source application. Referring to FIG. 6, the source application 510 serializes several image streams 610, 620, and 630 that the source application 510 is to share, to convert the several images 610, 620, and 630 into one serialized stream 600. The source application 510 may also set a data package format name of the corresponding serialized stream 600 to a predefined name, e.g., "SharedImageStreams", and provide the serialized stream 600 to the share broker program 520. Serialization may refer to a process of converting a stream including a series of bytes to store or transmit an object. Here, the object may be an image file, a document, a moving picture, or the like. The source application 510 may perform the serialization by using a serialization class provided from the OS 111. The source application 510 may use binary serialization, Extensible Mark-up Language (XML) serialization, Simple Object Access Protocol (SOAP) serialization, or the like. Here, SOAP is an XML-based protocol that is made to transmit a procedure call by particularly using an XML. As another example, serialization may refer to a process of translating data structures or object state data into a format that can be stored (for example, in a file or memory buffer, or transmitted across a network connection link) and reconstructed later in the same or another computer environment.

The target application 530 may define data format "sharedImageStreams" in "appxmanifest" to receive such a serialized stream.

For example, a data format may be defined in "apprx-manifest" as follows:

<Extension Category="windows.shareTarget">
<ShareTarget>
<DataFormat>SharedImageStreams</DataFormat>
</ShareTarget>
</Extension>

With reference to such a data format, the target application 530 may receive data that is provided in format "SharedImageStreams".

Figure 7:
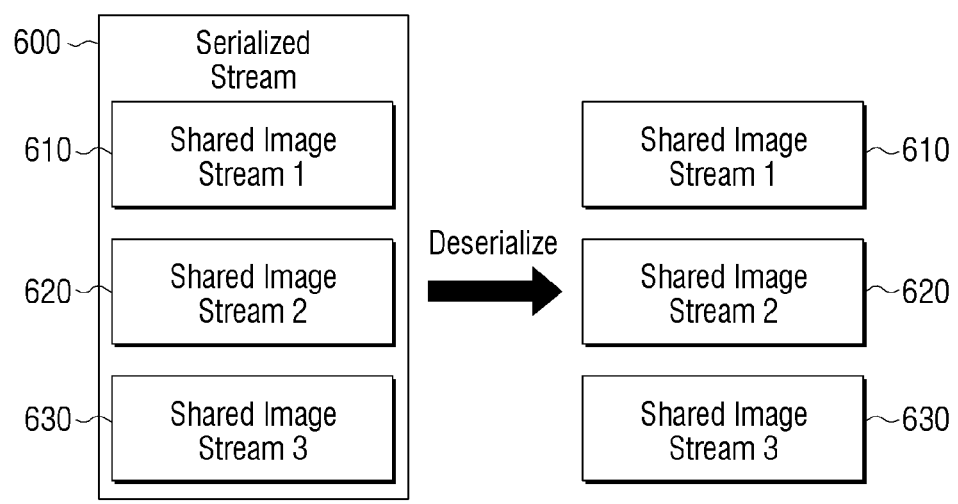
FIG. 7 is a view illustrating a deserialization job performed in a target application.

If a share data processing request is received from the OS 111, the target application 530 performs a deserialization process as shown in FIG. 7. Deserialization may refer to a process that is the opposite of serialization, for example, extracting individual object state data structure from a sequential series of bytes including data of multiple objects or separating image streams from a serialized stream.

FIG. 7 is a view illustrating a deserialization job performed in a target application. Referring to FIG. 7, the target application 530 performs deserialization for separating the image streams 610, 620, and 630 from the serialized stream 600. The target application 530 may detect an image from deserialized "SharedImageStream Collection" and use the detected image.

As described above, a source application and a target application may be variously selected.

Figure 8:
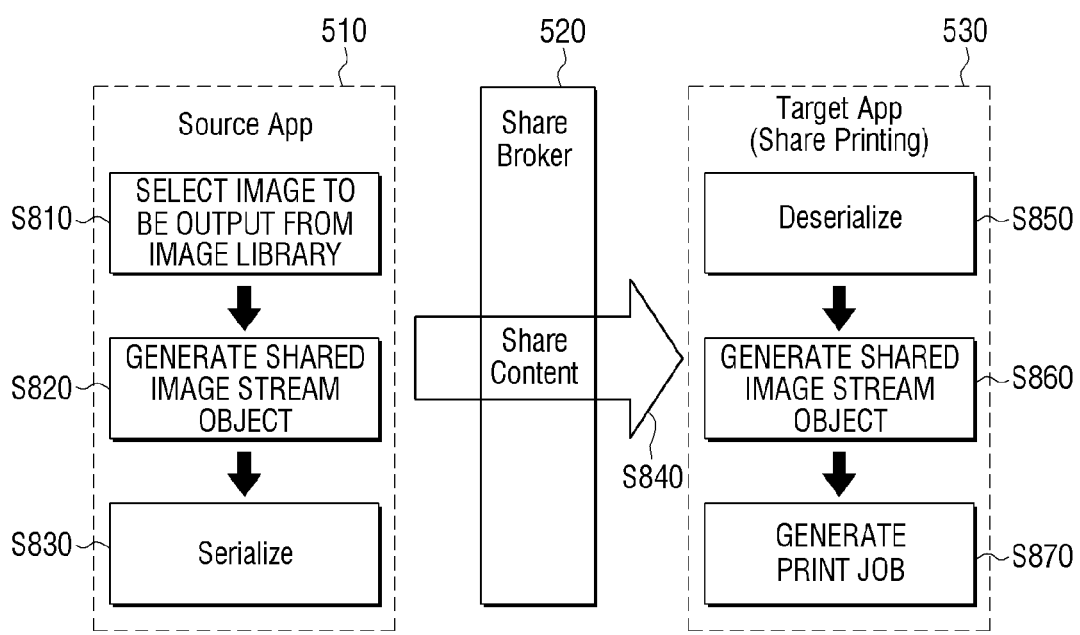
FIG. 8 is a view illustrating an operation of an application according to another exemplary embodiment of the present general inventive concept.

FIG. 8 illustrates a target application that is a printing application.

Referring to FIG. 8, the source application 510 may provide an image library view that shows pre-stored images. The image library view may be displayed on a display such as the display unit 140. In operation S810, the user selects one or more images that the user wants to output from the image library view. If images are selected, the source application 510 generates the selected images as objects "SharedImageStream" in operation S820, performs serialization to convert the objects "SharedImageStream" into one stream in operation S830, sets a data package format name to "SharedImageStreams", and provides the one stream to the share broker program 520. In this case, the source application 510 may register itself as a data transfer manager.

If a share command is input from the OS 111, the share broker program 520 replaces the target application 530 to transmit an event signal to the source application 510. The source application 510 responds to the event signal to start data package filing as described above. If the source application 510 completes the data package filing and a synchronization job, the share broker program 520 may filter target applications that may share data received from the source application 510, to provide a list. If the user selects one target application, the share broker program 520 provides a serialized stream to the target application 530 in operation S840.

If the serialized stream is received, the target application 530 performs deserialization to convert the serialized stream into several objects "SharedImageStream class" in operations S850 and S860. The target application 530 acquires an image stream from the objects "SharedImageStream class" to display a preview. If the user selects a print button in this state, the target application 530 performs a print job in operation S870.

In detail, the target application 530 may be wired or wirelessly connected to the user terminal device 100 or may search for a connectable peripheral printer and then may display the connectable peripheral printer on the display unit 140. If the user selects one printer in this state, the target application 530 converts each image stream into a printer language that may be recognized by the selected printer and provides the converted image stream to the corresponding printer. Therefore, the corresponding printer may control to output an image of each image stream on paper. As described above with reference to FIG. 4, if a preference option of the user is set, the preference option may be applied to a print job.

Figure 9:
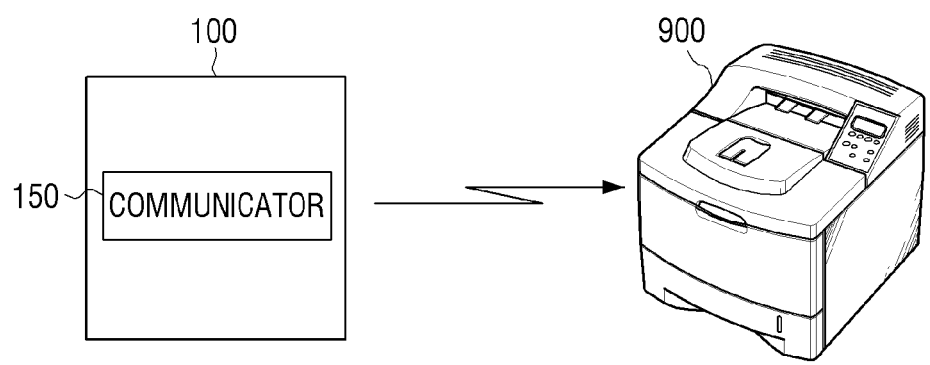
FIG. 9 is a view illustrating a method of performing a share printing function.

FIG. 9 is a view illustrating a method of performing printing by using a data share function. Referring to FIG. 9, the user terminal device 100 may further include a communicator 150. The communicator 150 is an element or application that communicates with an external printer 900. The communicator 150 may communicate with the external printer 900 according to various types of communication standards such as WiFi, Bluetooth, Zigbee, a local area network (LAN), a USB, near field communication (NFC), etc.

As described above with reference to FIG. 8, if at least one or more images are selected from images of the source application 510, and a printing application is selected as a target application that will share the selected images, the controller 130 copies the printing application into the memory 120 and executes the copied printing application. The controller 130 may display an image of the source application 510 on a printing UI.

Figure 10:
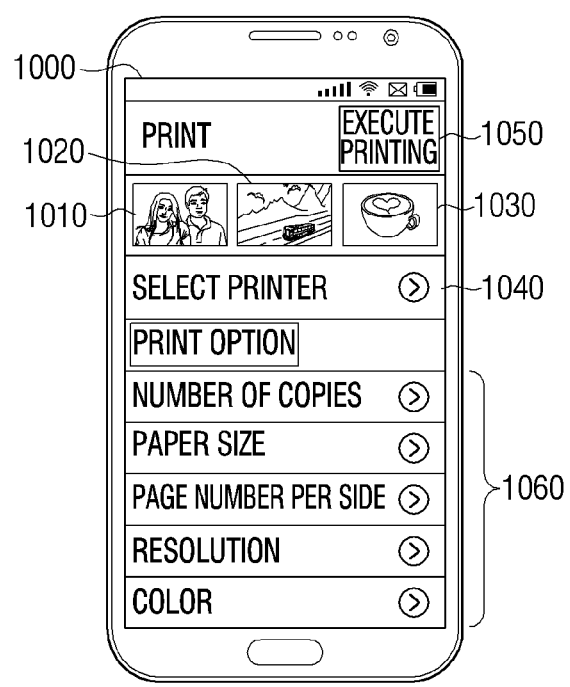
FIG. 10 is a view illustrating a user interface (UI) screen for performing a share printing function, according to an exemplary embodiment of the present general inventive concept.

FIG. 10 illustrates a printing UI according to an exemplary embodiment of the present general inventive concept. If an application for performing a printing job is executed, a printing UI 1000 as shown in FIG. 10 may be displayed on the display unit 140.

If three images are selected from images of the source application 510, previews 1010, 1020, and 1030 of the selected three images may be displayed on the printing UI 1000. Since an example of a UI displayed in a sharing process performed between the source application 510 and the target application 530 is as described in detail with reference to FIG. 2, repeated illustrations and descriptions are omitted.

Besides the previews 1010, 1020, and 1030, various types of objects, such as a printer selection area 1040, a print option selection area 1060, a print execution button 1050, etc., may be displayed on the printing UI 1000. After the user selects a printer that the user will use for printing, from the printer selection area 1040, and selects a print option through the print option selection area 1060, the user may select the print execution button 1050. In this case, the controller 130 converts respective images into print data according to an execution of the printing application and transmits the print data to the external printer 900 through the communicator 150.

According to the present exemplary embodiment as described above, the user may quickly print images stored in a portable device of the user.

Figure 11:
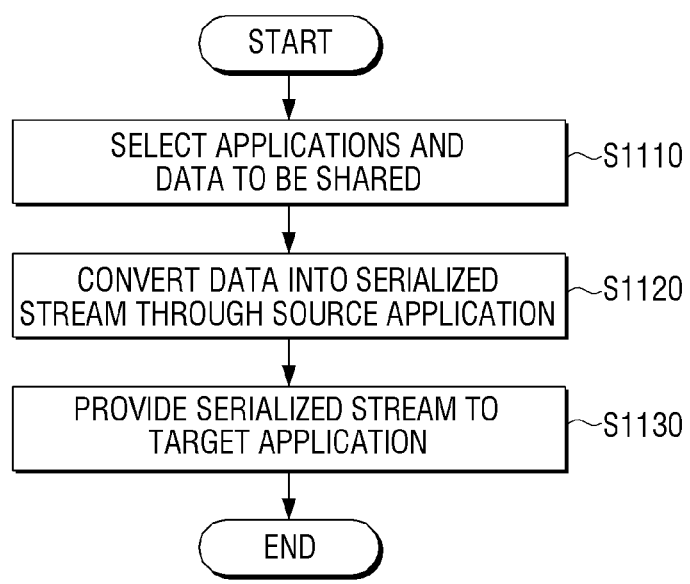

FIG. 11 is a flowchart illustrating a method of sharing data according to an exemplary embodiment of the present general inventive concept. Referring to FIG. 11, in operation S1110, a source application and a target application are selected from a plurality of applications installed in a user terminal device, data to be shared is selected, and a data share function is executed. In operation S1120, the source application converts the selected data into a serialized stream.

In operation S1130, the source application provides the converted serialized stream to the target application. A share broker program may intervene in this process. In this process, an operation of the share broker program, and operations of the source application and the target application have been described in detail in the above-described various exemplary embodiments, and thus their repeated descriptions are omitted.

FIG. 12 is a flowchart illustrating the method of FIG. 11 in more detail. Referring to FIG. 12, in operation S1210, the source application is executed. In operation S1215, the controller 130 displays a first UI screen on the display unit 140. If the source application is an application for viewing various types of content such as pictures, moving pictures, etc., a plurality of thumbnail images may be displayed on the first UI screen.

If a preset user manipulation is sensed in this state in operation S1220, the controller 130 additionally display a menu area on a side of the first UI screen in operation S1225. If a share menu is selected from the menu area in operation S1230, the user selects at least one or more content items such as images to be shared in operations S1235 and 1240.

If the images have been completely selected in operation S1235, the controller 130 integrates the selected images into a serialized stream in operation S1245 and searches for an application capable of sharing the images to display an application list in operation S1250. The controller 130 may determine applications having custom data formats as shown in FIG. 4 among installed applications as applications capable of sharing images.

If at least one target application is selected from the application list in operation S1255, the controller 130 provides the serialized stream to the target application in operation S1260. The target application performs deserialization with respect to the serialized stream in operation S1265 to acquire images. The controller 130 executes the target application to display a second UI screen including images selected by the user in operation S1270.

According to the present exemplary embodiment as described above, images may be converted into a serialized stream to be directly shared between applications. Therefore, a performance problem that occurs due to file (I/O) being relatively slower than a CPU processing speed may be solved. Also, according to the related art, a source application stores data, which is to be provided to a target application, as a storage file in a storage. The target application loads the storage file stored in the storage into a memory to display or process the storage file. As described above, in the related art, file (I/O) is required to be performed to share data between the source application and the target application. In this case, if a size of data to be transmitted is large or the number of files is large, a large amount of time is taken. On the contrary, according to the above-described various exemplary embodiments of the present general inventive concept, a target application may be immediately provided with data from a source application to display or process the data. In other words, the target application may efficiently and rapidly share the data of the source application without additional file I/O.

According to various exemplary embodiments as described above, applications installed in a user terminal device may share data using a rapid and efficient method.

A method of sharing data according to the above-described various exemplary embodiments may be coded as software and then stored on a non-transitory readable medium. The non-transitory readable medium may be installed and used in various types of devices.

For example, a program code may be stored on the non-transitory readable medium to be installed in an image forming apparatus, wherein the program code is encoded to perform one or more of the following operations: if a data share function is selected, converting data of a source application of a plurality of applications into a serialized stream; providing the serialized stream to a target application of the plurality of applications; and performing deserialization with respect to the serialized stream through the target application to detect data.

The non-transitory computer-readable medium refers to a medium which does not store data for a short time such as a register, a cache memory, a memory, or the like but rather to a medium that semi-permanently stores data and that is readable by a device. In detail, the above-described applications or programs may be stored and provided on a non-transitory computer readable medium such as a CD, a DVD, a hard disk, a blue-ray disk, a universal serial bus (USB), a memory card, a ROM, or the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the applications described herein may be executed by a dedicated hardware-based computer, controller, or processor unique to that unit or by a hardware-based computer, controller, or processor common to one or more of the modules. The described methods may be executed on a general purpose computer or processor or may be executed on a particular machine such as the user terminal device described herein.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A user terminal device having an operating system (OS) that has a first operation mode for driving a desktop application and a second operation mode for driving a metro application, the device comprising:
   a storage configured to store a plurality of applications;
   a memory configured to copy the plurality of applications stored in the storage;
   a controller configured to, in response to a selection of a data share function for sharing data used by a source application of the plurality of applications stored in the memory, convert the data into a serialized stream, and provide the serialized stream to a target application of the plurality of applications, wherein the controller executes the data share function among the plurality of applications without utilizing the storage and according to the OS.

2. The user terminal device of claim 1, wherein the plurality of applications share the data according to a custom data format that is defined to provide the data share function.

3. The user terminal device of claim 2, wherein the custom data format comprises at least one data format selected from among a first data format indicating a width of a stream to be transmitted, a second data format indicating a height of the stream, a third data format indicating a resolution, a fourth data format indicating an image format, a fifth data format indicating real image data, and a sixth data format indicating a preference option.

4. The user terminal device of claim 1, further comprising:
a display unit,
wherein the controller displays, on the display unit, a first user interface (UI) screen corresponding to the source application in response to the source application being selected from the plurality of applications, displays, on the display unit, a menu area comprising a share menu on a side of the first UI screen in response to a preset user manipulation being sensed, additionally displays an application list in the menu area in response to the share menu being selected from the menu area, and integrates a plurality of images into one serialized stream and provides the one serialized stream to the target application in response to the target application being selected from the application list and the plurality of images being selected from the first UI screen.

5. The user terminal device of claim 4, wherein the application list comprises a list that collects information about an application capable of operating with the source application or an application capable of using the data.

6. The user terminal device of claim 4, wherein in response to the serialized stream being provided to the target application, the controller deserializes the serialized stream and displays a second UI screen corresponding to the target application on the display unit,
wherein the second UI screen comprises the plurality of images obtained from the deserialized serialized stream.

7. A method of sharing data of a user terminal device having an operating system (OS) that has a first operation mode for driving a desktop application and a second operation mode for driving a metro application, the method comprising:
in response to a selection of a data share function for sharing data used by a source application of a plurality of applications installed in the user terminal device, converting the data into a serialized stream; and
providing the serialized stream to a target application of the plurality of applications,
wherein the user terminal device executes the data share function among the plurality of applications without utilizing a storage and according to the OS.

8. The method of claim 7, wherein the plurality of applications share the data according to a custom data format that is defined to provide the data share function.

9. The method of claim 8, wherein the custom data format comprises at least one data format selected from among a first data format indicating a width of a stream to be transmitted, a second data format indicating a height of the stream, a third data format indicating a resolution, a fourth data format indicating an image format, a fifth data format indicating real image data, and a sixth data format indicating a preference option.

10. The method of claim 8, further comprising:
in response to the source application being selected, displaying a first UI screen corresponding to the source application; and
in response to a preset user manipulation being sensed, additionally displaying a menu area on a side of the first UI screen,
wherein the data share function is executed in response to a share menu being selected from the menu area.

11. The method of claim 10, wherein the converting the data into the serialized stream comprises:
in response to a plurality of images being selected from the first UI screen, integrating an image stream of each of the plurality of images to generate the serialized stream.

12. The method of claim 11, further comprising:
in response to the serialized stream being provided to the target application, deserializing the serialized stream and displaying a second UI screen corresponding to the target application,
wherein the second UI screen comprises the plurality of images obtained from the deserialized serialized stream.

13. The method of claim 7, wherein the data is converted into the serialized stream using a binary serialization, an Extensible Mark-up Language (XML) serialization, or a Simple Object Access Protocol (SOAP) serialization.

14. A recording medium storing a program for executing a method of sharing data of a user terminal device having an operating system (OS) that has a first operation mode for driving a desktop application and a second operation mode for driving a metro application, wherein the method comprises:
in response to a data share function being selected, converting data, which is being used by a source application of a plurality of applications, into a serialized stream;
providing the serialized stream to a target application of the plurality of applications; and
performing deserialization with respect to the serialized stream via the target application to detect the data,
wherein the data comprises a plurality of images,
wherein the user terminal device executes the data share function among the plurality of applications without utilizing a storage and according to the OS.

15. The recording medium of claim 14, wherein the plurality of applications share the data according to a custom data format that is defined to provide the data share function.

16. The user terminal device of claim 1, wherein the controller converts the data into the serialized stream using a binary serialization, an Extensible Mark-up Language (XML) serialization, or a Simple Object Access Protocol (SOAP) serialization.

17. An apparatus, having an operating system (OS) that has a first operation mode for driving a desktop application and a second operation mode for driving a metro application, the apparatus comprising:
a storage to store the source application and the target application; and
a hardware-based controller configured to control the source application to convert data used by a source application into a serialized stream and to provide the serialized stream to a target application where the controller is further configured to control the target application to deserialize the serialized stream to obtain the data for use by the target application, wherein the data is shared between the source application and the target application without utilizing the storage.

18. The apparatus of claim 17, further comprising a share broker, wherein the source application transmits the serialized stream in a custom data format to the share broker and the share broker transmits the serialized stream in the custom data format to the target application.

* * * * *